United States Patent
Shroff et al.

(10) Patent No.: US 10,558,939 B2
(45) Date of Patent: Feb. 11, 2020

(54) SYSTEMS, METHODS, APPARATUSES AND COMPUTER PROGRAM PRODUCTS FOR FACILITATING PRODUCT EXCHANGE SERVICES

(75) Inventors: Sumeet Pradeep Shroff, Chamblee, GA (US); Jeremy Michael Melis, Kennesaw, GA (US); Peter Wilhelm Wonnemann, Mainz (DE); Torsten Helge Huebner, Kaarst (DE)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 1198 days.

(21) Appl. No.: 13/338,858

(22) Filed: Dec. 28, 2011

(65) Prior Publication Data

US 2013/0173490 A1 Jul. 4, 2013

(51) Int. Cl.
*G06Q 10/08* (2012.01)

(52) U.S. Cl.
CPC ......... *G06Q 10/08* (2013.01); *G06Q 10/0837* (2013.01)

(58) Field of Classification Search
CPC .... G06Q 10/087; G06Q 10/08; G06Q 10/083; G06Q 10/0833; G06Q 10/0835; G06Q 10/0837
See application file for complete search history.

(56) References Cited

U.S. PATENT DOCUMENTS

| | | | |
|---|---|---|---|
| 2002/0032612 A1* | 3/2002 | Williams et al. | 705/26 |
| 2002/0035515 A1* | 3/2002 | Moreno | 705/26 |
| 2003/0225592 A1* | 12/2003 | Algazi et al. | 705/1 |
| 2008/0249915 A1* | 10/2008 | Manstein et al. | 705/37 |
| 2010/0145754 A1* | 6/2010 | Rahman | 705/8 |
| 2011/0173129 A1* | 7/2011 | Mack | 705/340 |

OTHER PUBLICATIONS

Overstock.com now stocks innovative returns management; popular online retailer selects newgistics SmartLabel and ReturnCart to boost customer loyalty through convenient returns. (Jan. 16, 2006). Business Wire Retrieved from http://dialog.proquest.com/professional/docview/675850632?accountid=142257 (Year: 2006).*

* cited by examiner

*Primary Examiner* — Michael P Harrington
(74) *Attorney, Agent, or Firm* — Shook, Hardy & Bacon L.L.P.

(57) ABSTRACT

An apparatus for facilitating product exchanges includes a processor and memory storing executable computer code causing the apparatus to at least perform operations including triggering an exchange procedure to return a product(s) to an entity responsive to receipt of an indicated selection of a return service option. The computer program code may further cause the apparatus to generate a return label(s) and identify a box(es) for inclusion of the product responsive to the receipt of the indicated selection and may generate a notification(s) notifying a user of a pickup time for the product and receive an indication that the product is packaged in the box(es), that information of the return label is captured and that the product is collected for delivery. The computer program code may further cause the apparatus to receive an indication that the product is delivered to entity. Corresponding methods and computer program products are also provided.

23 Claims, 9 Drawing Sheets

FIG. 7

SYSTEMS, METHODS, APPARATUSES AND COMPUTER PROGRAM PRODUCTS FOR FACILITATING PRODUCT EXCHANGE SERVICES

TECHNOLOGICAL FIELD

Exemplary embodiments of the invention relate generally to systems, methods, apparatuses and computer program products for facilitating product returns and more particularly relates to a mechanism of improving product exchange services.

BACKGROUND

Currently, some companies selling products to customers have procedures in place to enable a customer to return a purchased product to the company and in return the customer may receive another product. In some instances, a company may allow a customer to return a defective product, and upon receipt of the defective product, the company may send the customer another product.

Oftentimes, products to be returned to a company are expensive, highly-technological and/or important to a customer's business. As such, for example, a company may allow a customer to initiate the process of returning the defective product and the company may subsequently send a replacement unit to the customer once the defective product is received.

One drawback of current product return systems arises due to failure of the customer to return a product. In this regard, in some instances, the company may not receive the product(s) to be returned which may cause the company to expend resources (e.g., monetary costs) to retrieve the product from the customer.

As such, a need may exist to provide a systematic and efficient approach to improve the return ratio of products and to provide a more reliable, efficient and seamless product returns process.

BRIEF SUMMARY

In general, example embodiments of the invention may provide systems, methods, apparatuses and computer program products for facilitating product exchanges.

Some example embodiments may provide product exchange services that may fill a gap for companies with products (e.g., high value/high tech products) that may have warranty/maintenance agreements with their customers. In this regard, some example embodiments may allow companies and/or manufacturers to improve their warranty replacement process by effectively managing the direct exchange of products.

An example embodiment may provide an automated product exchange process that provides improved profitability by providing a one stop solution to customers seeking to gain more control over a product return process and/or a product replacement process.

In one example embodiment, selection of a product exchange service option (e.g., by a computing device), for shipment of a replacement item(s)/product(s) may trigger a device (e.g., a network device) to begin a product exchange process. In response to the selection, the device may generate an outbound delivery label and package return label (PRL) and sealing material for a product return to be picked up from a user and may arrange for delivery of a replacement item(s)/product(s) at the time of the pickup of the item(s)/product(s). In an instance in which a driver delivers the replacement item(s)/product(s) to an end user, the user and/or the driver may repack the box in which the replacement item(s)/product(s) was packaged with the return product and may attach the return label to the box. The replacement item(s)/product(s) may then be shipped back to the entity. It should be pointed out that the delivery may not be completed if the product exchange does not take place. As such, some example embodiments may increase the return ratio of products to an entity (e.g., a company, a manufacturer).

In another example embodiment, the selection of a return option such as, for example, a pack and collect service option provided by a device may trigger generation of a returns process. In this returns process, the selection of the returns option may trigger the device to generate a returns label and identify one or more collection boxes to be sent/delivered to a user for pickup of a product to be returned. In this example embodiment, the delivery of the collection boxes to the user by a driver and pickup of the product(s) for return from the user, by the driver, may occur at the same time/location. For example, upon delivery of the boxes by a driver as well as a return label to the user, the user and/or a driver may pack the product in the box and may deliver the product to the entity during a single transaction (e.g., at the location of the delivery destination).

In some example embodiments, scanned information associated with the delivery (e.g., an outbound delivery, an inbound delivery) of products for returns may be utilized to track the visibility products in transit and enable better planning for returns (e.g., better planning for process staffing, warehouse space utilization, etc.) by being able to obtain a full visibility of defective product stock in transit and enable reallocation of resources to handle the defective product stock.

In addition, by providing correct packaging (e.g., collection boxes) for the delivery of a return product(s), some example embodiments may eliminate consignee error and may minimize in transit damage for returns. The example embodiments may also reduce the carbon footprint of vehicles delivering the products for return by minimizing transit legs and reducing packaging needs.

In one example embodiment, a method for facilitating product exchanges is provided. The method may include triggering an exchange procedure to facilitate return of at least one product of a user to an entity in response to receipt of an indication of a selection of a return service option among a plurality of product return options. The method may further include generating at least one shipping return label and identifying at least one collection box for inclusion of the product in response to the receipt of the indication of the selection and generating one or more notifications sent to at least one device notifying the user of a scheduled time or time period for pickup of the product. The method may further include receiving a first indication that the product for return to the entity is packaged in the collection box, that scanned information of the return label is captured and that the product is collected from the user for delivery to the entity and receiving a second indication that the product is delivered to the entity. The product is packaged in the collection box, the information of the return label is captured and the product is collected from the user during the pickup in a single transaction.

In another example embodiment, an apparatus for facilitating product exchanges is provided. The apparatus may include a processor and memory including computer program code. The memory and the computer program code are configured to, with the processor, cause the apparatus to at least perform operations including triggering an exchange procedure to facilitate return of at least one product of a user to an entity in response to receipt of an indication of a selection of a return service option among a plurality of product return options. The at least one memory and the computer program code may also be configured to, with the processor, cause the apparatus to generate at least one shipping return label and identify at least one collection box for inclusion of the product in response to the receipt of the indication of the selection and generate one or more notifications sent to at least one device notifying the user of a scheduled time or time period for pickup of the product. The at least one memory and the computer program code may also be configured to, with the processor, cause the apparatus to receive a first indication that the product for return to the entity is packaged in the collection box, that scanned information of the return label is captured and that the product is collected from the user for delivery to the entity and receive a second indication that the product is delivered to the entity. The product is packaged in the collection box, the information of the return label is captured and the product is collected from the user during the pickup in a single transaction.

In another example embodiment, a computer program product for facilitating product exchanges is provided. The computer program product includes at least one computer-readable storage medium having computer-executable program code portions stored therein. The computer-executable program code instructions may include program code instructions configured to trigger an exchange procedure to facilitate return of at least one product of a user to an entity in response to receipt of an indication of a selection of a return service option among a plurality of product return options. The program code instructions may also be configured to generate at least one shipping return label and identify at least one collection box for inclusion of the product in response to the receipt of the indication of the selection and generate one or more notifications sent to at least one device notifying the user of a scheduled time or time period for pickup of the product. The program code instructions may also be configured to cause receipt of a first indication that the product for return to the entity is packaged in the collection box, that scanned information of the return label is captured and that the product is collected from the user for delivery to the entity and cause receipt of a second indication that the product is delivered to the entity. The product is packaged in the collection box, the information of the return label is captured and the product is collected from the user during the pickup in a single transaction.

BRIEF DESCRIPTION OF THE SEVERAL VIEWS OF THE DRAWINGS

Figure 1:
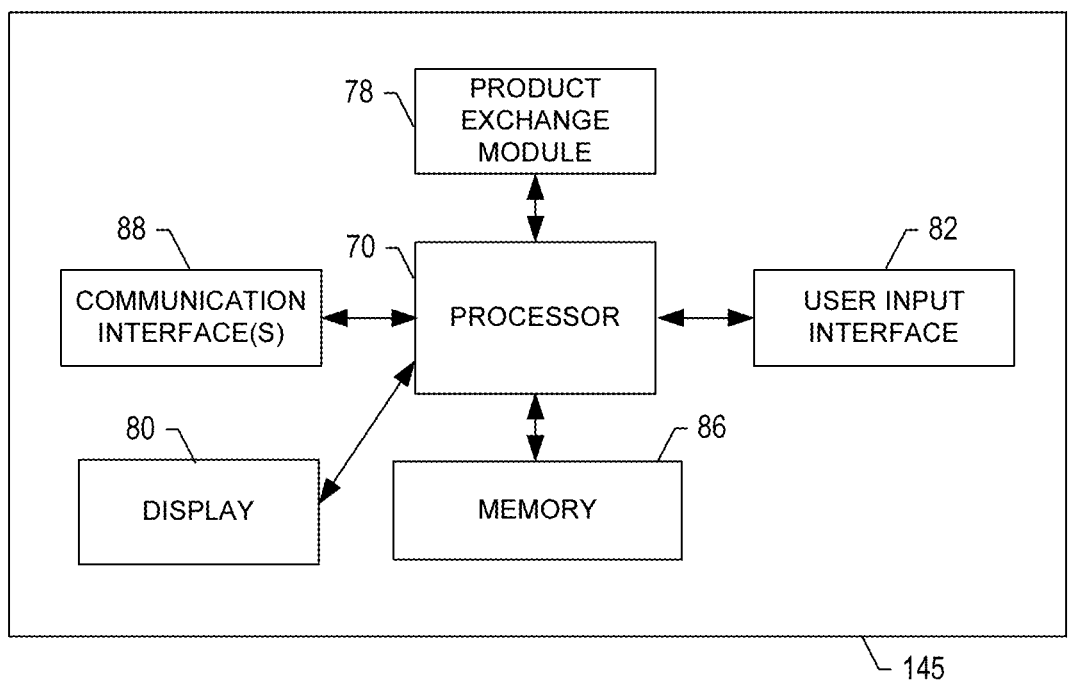
Figure 2:
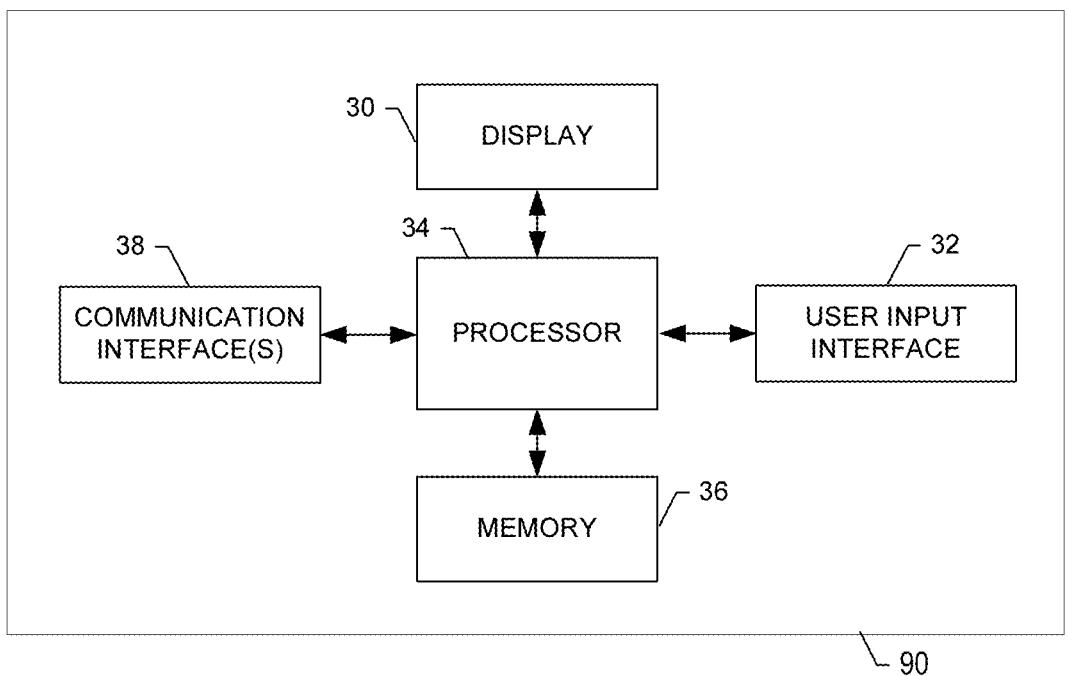
Figure 3:
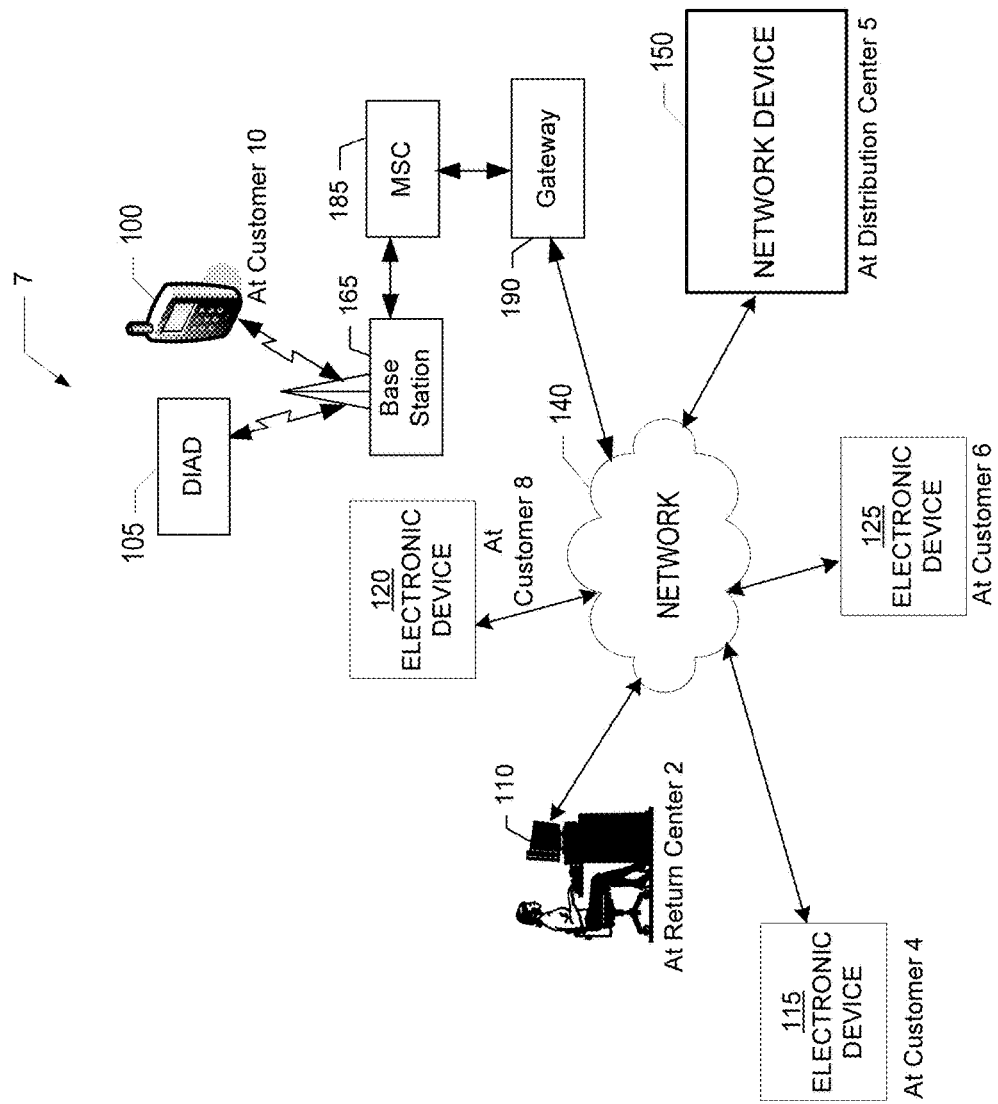
Figure 4:
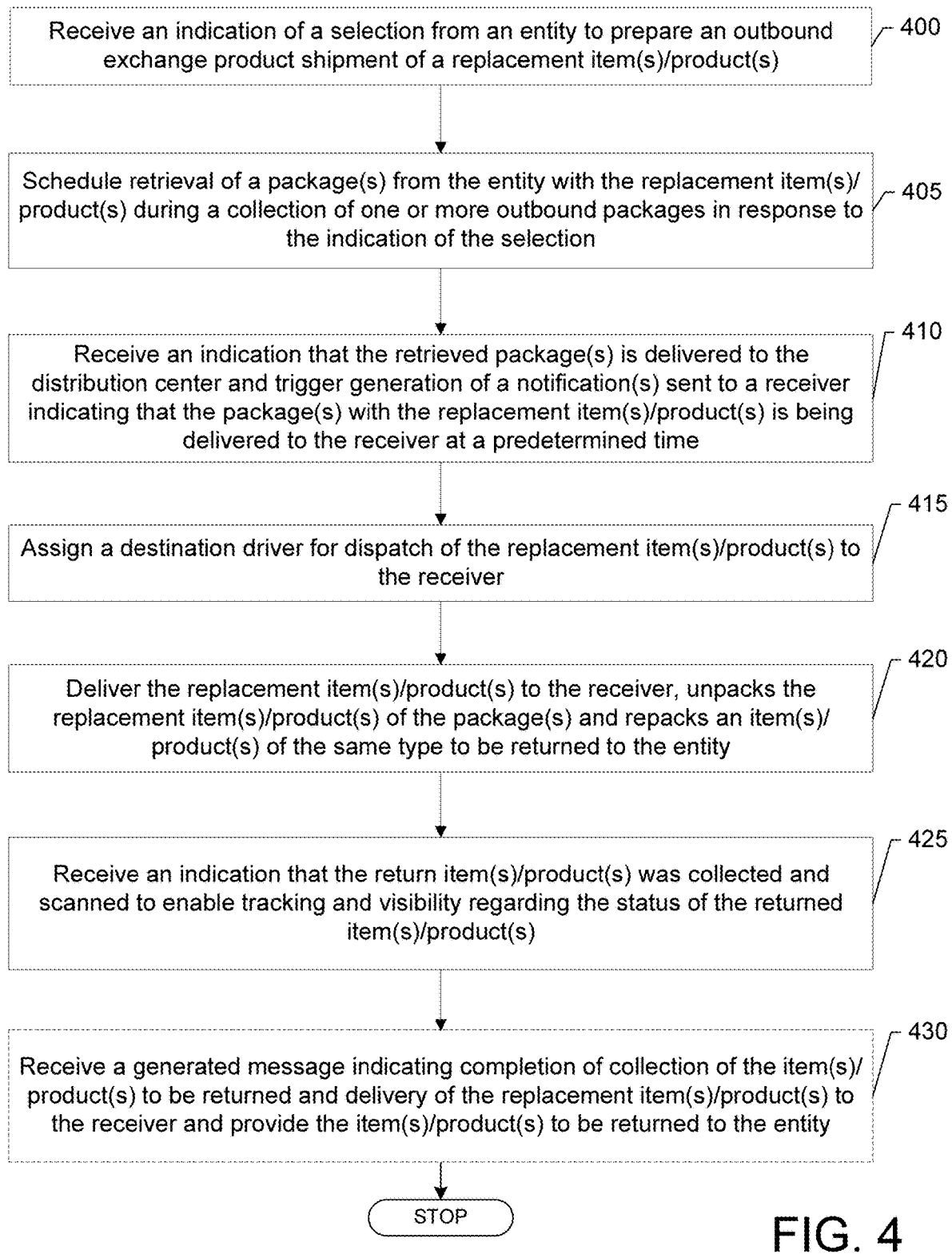
Figure 5:
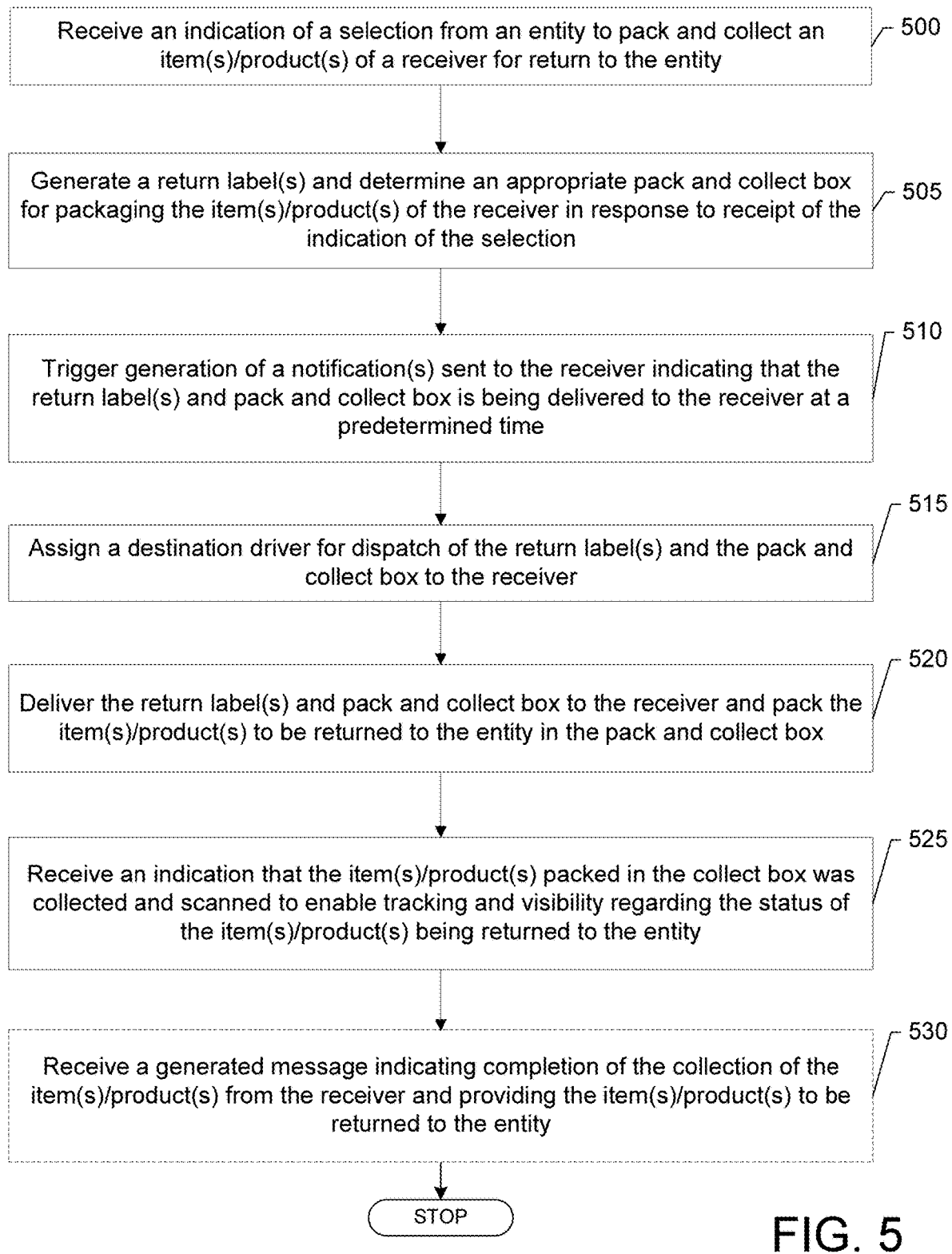
Figure 6:
Figure 8B:
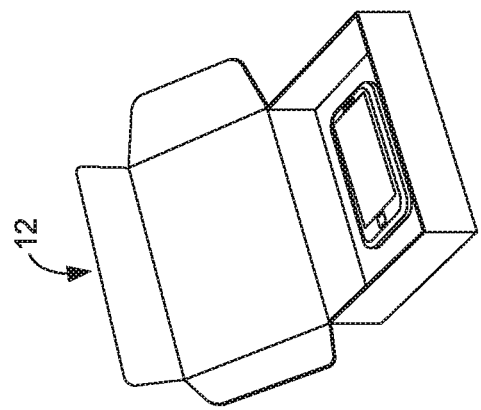
Figure 8C:
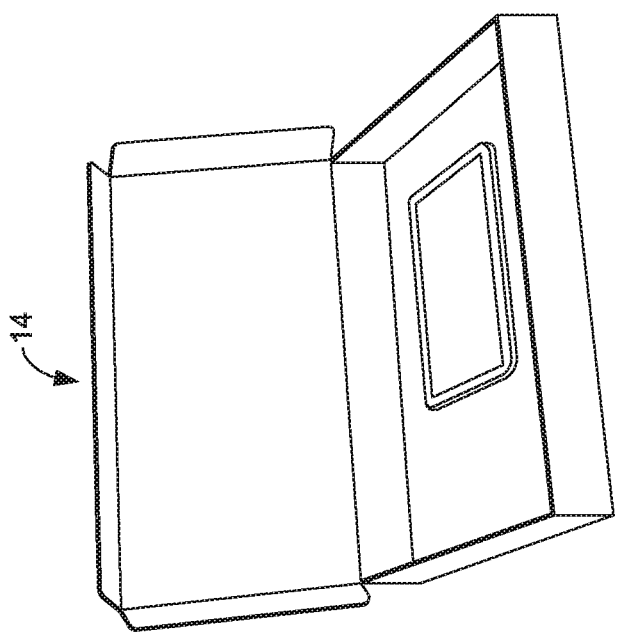
Figure 8A:
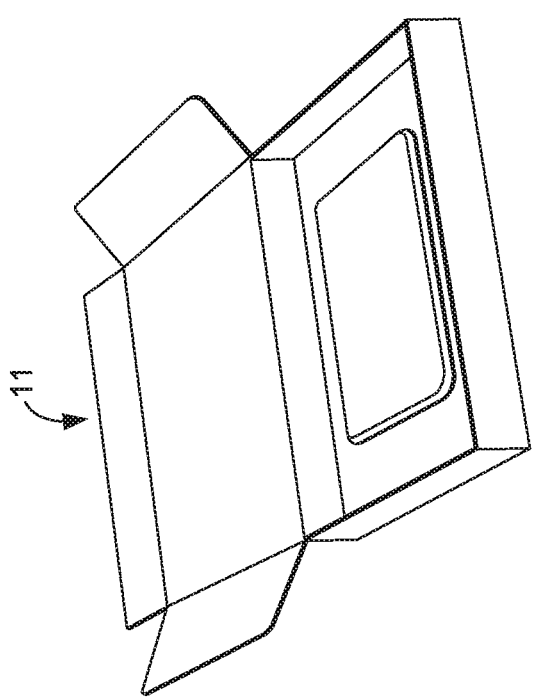
Figure 9:
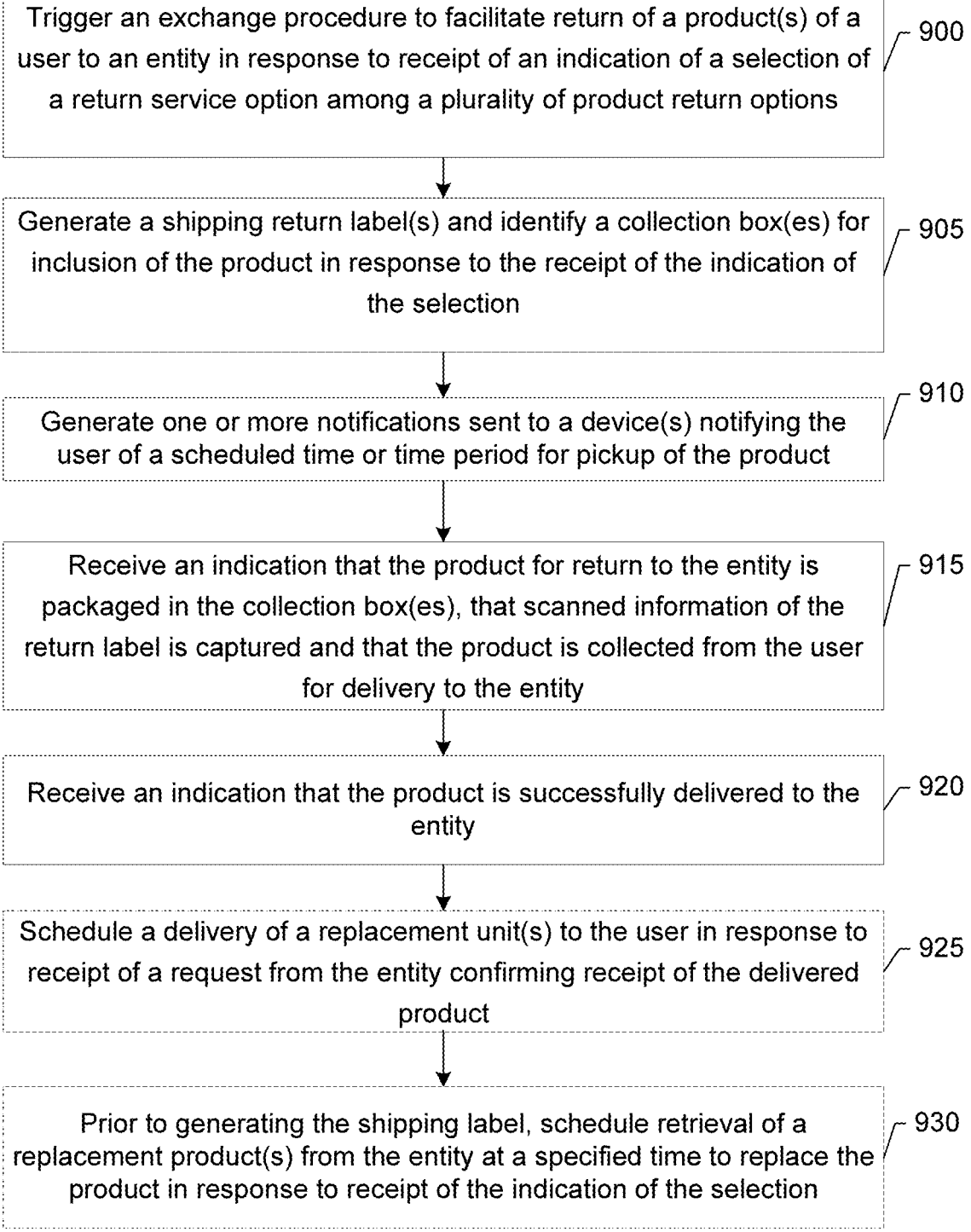

Having thus described the invention in general terms, reference will now be made to the accompanying drawings, which are not necessarily drawn to scale, and wherein:

FIG. 1 is a schematic block diagram of a communication device according to an example embodiment of the invention;

FIG. 2 is a schematic block diagram of a computing device according to an example embodiment of the invention;

FIG. 3 is a schematic block diagram of a system for facilitating product exchanges via a returns process according to an example embodiment of the invention;

FIG. 4 illustrates a flowchart for facilitating product exchanges according to an example embodiment of the invention;

FIG. 5 illustrates a flowchart for facilitating product exchanges according to another example embodiment of the invention;

FIG. 6 is a diagram illustrating a package exchange service label according to an example embodiment of the invention;

FIG. 7 is a diagram illustrating a pack and collect service label according to an example embodiment of the invention;

FIGS. 8A, 8B and 8C are diagrams illustrating pack and collect boxes according to an example embodiment of the invention; and FIG. 9 illustrates a flowchart for facilitating product exchanges according to another example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

Communication Device

FIG. 1 illustrates a block diagram of a communication device according to an exemplary embodiment of the invention. The communication device 145 may, but need not, be a network device such as, for example, a server. The communication device 145 includes various means for performing one or more functions in accordance with exemplary embodiments of the invention, including those more particularly shown and described herein. It should be understood, however, that one or more of the communication devices may include alternative means for performing one or more like functions, without departing from the spirit and scope of the invention. More particularly, for example, as shown in FIG. 1, the communication device 145 may include a processor 70 connected to a memory 86. The memory may comprise volatile and/or non-volatile memory, and typically stores content (e.g., media content), data, information or the like.

For example, the memory may store content transmitted from, and/or received by, one or more electronic devices (e.g., electronic devices 110, 115, 120 and 125 of FIG. 3). In this regard, in an exemplary embodiment, the memory 86 may store data received from different sources. For example, the memory 86 may store information associated with requests received by the communication device 145 from other electronic devices requesting an exchange of one or more products, as well as any other suitable information.

Also for example, the memory 86 typically stores client applications, instructions, algorithms or the like for execution by the processor 70 to perform steps associated with operation of the communication device 145 in accordance with embodiments of the invention. As explained below, for example, the memory 86 may store one or more client applications such as, for example, software (e.g., software code also referred to herein as computer code).

The processor 70 may be embodied in a variety of ways. For instance, the processor 70 may be embodied as a controller, coprocessor, microprocessor of other processing devices including integrated circuits such as, for example, an application specific integrated circuit (ASIC), a field programmable gate array (FPGA). In an exemplary embodiment, the processor may execute instructions stored in the memory 86 or otherwise accessible to the processor 70.

The communication device 145 may include one or more logic elements for performing various functions of one or more client applications. In an exemplary embodiment, the communication device 145 may execute the client applications. The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the communication device is capable of communicating with other devices such as, for example, electronic devices (e.g., electronic devices 110, 115, 120, 125 of FIG. 3) over one or more networks (e.g., network 140) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

The signals that the communication interface 88 may receive and/or transmit may include information consisting of speech (e.g., voice data) and/or user generated data in accordance with an air standard interface standard of a cellular system, for example. In this regard, the communication device may operate in accordance with one or more wireless communication protocols. In an alternative example embodiment, the communication device may operate in accordance with non-cellular communication mechanisms such as, for example, landline signals received from a Public Switched Telephone Network (PSTN).

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an example embodiment, the processor 70 may be in communication with and may otherwise control a product exchange module 78. The product exchange module 78 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the product exchange module 78, as described below. In examples in which software is employed, a device or circuitry (e.g., processor 70 in one example) executing the software forms the structure associated with such means. As such, for example, the product exchange module 78 may be configured to, among other things, trigger generation of an outbound exchange service shipment of a replacement item(s) and for collecting a same type of item(s) during the delivery of the replacement item(s). Additionally, the product exchange module 78 may be configured to trigger generation of retrieval of products and generation of a returns label for the retrieved products as well as one or more collection boxes. The one or more collection boxes may be utilized for pickup of the retrieved item(s) to be returned to an entity (e.g., a company, a manufacturer of the item(s)), as described more fully below.

The product exchange module 78 may generate one or more notification messages that may be sent to electronic devices (e.g., electronic devices 110, 115, 120, 125 of FIG. 3) of users. The notification messages may include information indicating that a carrier may pickup an item(s) to be retrieved and/or for delivery of an item(s) of the same type at a specified time or during a specified time period. In one example embodiment, the product exchange module 78 may automatically generate one or more notification messages to be sent to devices upon expiration of a predetermined time period prior to a scheduled arrival time for retrieval of an item(s). In this manner, a user may plan ahead of time to be available for the retrieval of the item(s). The information in the notification message may include, but is not limited to, voice data, text data, email data, multimedia data or any other suitable data.

Computing Device

Referring now to FIG. 2, a block diagram of a computing device according to an exemplary embodiment is provided. As shown in FIG. 2, the computing device 90 may include a processor 34 connected to a memory device 36. The memory device 36 (also referred to herein as memory 36) may comprise volatile and/or non-volatile memory, and may store content, information, data or the like. For example, the memory device 36 typically stores content transmitted from, and/or received by, the computing device. Additionally, the memory device 36 may store client applications, software (e.g., software code) algorithms, instructions or the like for the processor 34 to perform steps associated with operation of the computing device.

The memory device 36 may store product return information associated with one or more customers, companies, shipping carriers, etc. For example, in one example embodiment, the memory device 36 may store information associated with one or more requests for retrieval of an item(s)/product(s) to be returned to an entity (e.g., a company, a manufacturer, a shipping carrier, etc.) and/or for pickup of an item(s)/product(s) and/or replacement of the item(s)/product(s) of the same type at the time of pickup. The retrieved item(s)/product(s) for return to the entity may, but need not, be a defective product(s), a damaged product(s), a product(s) under warranty or any other suitable product(s).

The processor 34 may be connected to at least one communication interface 38 or other means for displaying, transmitting and/or receiving data, content, information or the like. In this regard, the communication interface 38 may be capable of connecting to one or more networks. The computing device may also include at least one user input interface 32 that may include one or more speakers, a display 30, and/or any other suitable devices. For instance, the user input interface 32 may include any of a number of devices allowing the computing device to receive data from a user, such as a keyboard, a keypad, mouse, a microphone, a touch screen display, or any other input device.

The processor 34 may generate one or more requests for returning an item(s)/product(s) to an entity. In this regard, in one example embodiment, the request(s) may include data specifying retrieval of an item(s)/product(s) for pickup and delivery to the entity. In this regard, a carrier picking up the item(s)/product(s), may provide the user requesting the retrieval of the item(s)/product(s) with a generated shipping label(s) and a collection box(es) in which the item(s) may be packed and delivered by the carrier to the entity.

Additionally, in an alternative example embodiment, the request(s) may include data requesting a replacement item(s)/product(s) of a same or similar type as an item(s)/product(s) to be picked up and returned to an entity by a carrier. The request(s) may include data specifying that the replacement item(s) is to be delivered at same time that the carrier is scheduled to pickup the item(s)/product(s) to be returned to the entity.

General System Architecture

Reference is now made to FIG. 3, which is a block diagram of an overall system that would benefit from exemplary embodiments of the invention. It should be pointed out that the mobile or fixed phone 100, delivery information acquisition device (DIAD) 105, electronic devices 110, 115, 120 and 125 (e.g., personal computers, laptops, personal digital assistants and the like) may comprise the elements of the computing device 90 of FIG. 2.

In the system 7 of FIG. 3, the mobile or fixed phone 100, as well as electronic devices 115, 120 and 125 may, but need not, be maintained and operated by one or more customers such as, for example, customers 4, 8 and 6, respectively. The electronic device 110 may, but need not, be operated and maintained on behalf of a return center 2. The electronic device 110 maintained by return center 2 may be configured to receive one or more requests for item(s)/product(s) returns or exchanges from one of more of the electronic devices 115, 120, 125 and/or the phone 100 of the customers (e.g., customers 4, 8, 6 and 10), as described more fully below. The return center 2 may be operated by an entity such as, for example, a company or manufacturer of the items/products that may be requested for return.

The network device 150 (e.g., communication device 145) may, but need not, be operated and maintained on behalf of an entity such as, for example, a distribution center 5. The network device 150 is capable of tracking and monitoring activity within the system 7. In an example embodiment, the entity that is capable of tracking and monitoring activity within the system 7 may be a carrier such as, for example, a shipping carrier. In other words, the distribution center 5 may be maintained and operated by a shipping carrier. The DIAD 105 may be utilized by any suitable entity (e.g., staff personnel (e.g., drivers) of a shipping carrier). For instance, in one example embodiment, the DIAD 105 may be utilized to scan an item(s)/product(s) of a customer (e.g., customer 8) to be retrieved by the shipping carrier for return to the return center 2, as described more fully below.

Each of the electronic devices 110, 115, 120 and 125 may access the network device 150 or similar network entity, over a network 140, such as a wired or wireless local area network (LAN), a metropolitan network (MAN) or a wide area network (WAN) (e.g., the Internet). In an alternative example embodiment, the network 140 may be the Internet. Although one phone 100 and four electronic devices 110, 115, 120 and 125 are shown in FIG. 3, it should be pointed out that any suitable number of phones 100 and electronic devices 110, 115, 120 and 125 may be part of the system of FIG. 3 without departing from the spirit and scope of the invention.

The electronic device 110 may also be capable of receiving and/or transmitting voice data (e.g., speech data) that may be associated with telephone calls, for example. In this regard, the electronic device 110 may receive voice data (e.g., Voice over Internet Protocol (VoIP) data) from a customer (e.g., customer 10) requesting a return of an item(s)/product(s).

As described above, the system 7 may include a mobile or fixed phone 100 and a scanning/tracking device such as, for example, a DIAD 105. The DIAD 105 and the mobile or fixed phone 100 may each include an antenna (not shown) for transmitting signals to a base station 165 or receiving signals from a base station 165 as shown in FIG. 3. The DIAD 105 may be a mobile device and may be moved throughout the system 7. The base station 165 may consist of a cellular network, which may include elements required to operate the network, such as, for example, a mobile switching center (MSC) 185. The MSC 185 is configured to route information to and from the mobile or fixed phone 100 and the DIAD 105. The MSC 185 may be coupled to a gateway 190, and the gateway 190 may be coupled to a network 140 (e.g., the Internet). As such, the electronic devices 110, 115, 120 and 125 as well as the network device 150 may be coupled to the mobile or fixed phone 100 as well as the DIAD 105 via the network 140. The DIAD 105 may include a scanning device executed by a processor, controller or the like that is configured to scan information such as, for example, one or more codes, labels, (e.g., bar code labels) tracking numbers or the like. The information obtained by scanning may be transmitted to the network device 150 which may store this information in its memory (e.g., memory 36). The network device 150 may, but need not, upload this information to a web site. The scanned information may be utilized to provide tracking information and visibility information regarding the status of items/products (e.g., a returned item(s)/product(s), a replacement item(s)/product(s)) in transit. In an example embodiment, the DIAD 105 may scan shipping labels or tracking numbers on various items, products, etc. These items or products may include, but are not limited to, defective devices or units, replacement devices or units and any other suitable products. The scanned information may be provided by the DIAD 105 to the network device 150 and the network device 150 may, but need not, upload the information to a web site, as described above. It should be pointed out that although only one DIAD 105, base station 165, MSC 185 and gateway 190 is shown in FIG. 3 any suitable number of DIADs 105, base stations 165, MSCs 185 and gateways 190 may be within system 7 without departing from the spirit and scope of the invention.

Exemplary System Operation

Exemplary embodiments of the invention may provide an efficient and reliable mechanism for providing exchange services for return of products. As such, some exemplary embodiments may provide a mechanism for facilitating exchange of products as well as shipping services for pickup and/or delivery of the products to be returned. Additionally, in one example embodiment, the return services may combine delivery of a replacement item(s)/product(s) and collection of an item(s)/product(s) of the same type in one seamless transaction. As such, the exchange services of some of the example embodiments may improve the return ratio of products such as, for example, defective products and/or products under warranty, as well as any other suitable products.

In some alternative example embodiments, the new/replacement item(s)/product(s) may not be delivered to a customer at the time of pickup by a carrier of an item(s)/product(s) to be returned. Instead, the carrier (e.g., shipping carrier) may provide/deliver an empty box(es) to a customer and may collect and return an item(s)/product(s) that is requested to be returned to an entity. The carrier may collect the item(s)/product(s) for return to the entity in the box(es) during the delivery of the box(es) to the customer in one seamless transaction to facilitate a one-stop execution for product exchange.

Reference will now be made to FIG. 4, which illustrates an example method of facilitating an exchange of one or more products according to an example embodiment. At operation 400, an apparatus (e.g., network device 150) may receive an indication of a selection from an entity (e.g., electronic device 110 of return center 2) to prepare an outbound product exchange shipment of a replacement item(s)/product(s). A device (e.g., electronic device 110) of the entity may select the indication to prepare the outbound exchange product shipment in response to receipt of an indication from a device of a receiver (also referred to herein as customer) (e.g., customer 4, etc.) of a request for a replacement item(s)/product(s) of a same or similar type as an item(s)/product(s) that the receiver purchased/obtained from the entity (e.g., a company, a manufacturer). In one example embodiment, the receiver may utilize a phone (e.g., phone 100) or an electronic device (e.g., one of electronic devices 115, 120, 125) to indicate the request for the replacement item(s)/product(s). The item(s)/product(s) purchased by the receiver may, but need not, be defective. At operation 405, an apparatus (e.g., network device 150 of the distribution center 5) may schedule retrieval of a package(s) including the replacement item(s)/product(s), from the entity (e.g., return center 2), during a collection of one or more outbound packages in response to receipt of the indication of the selection by the entity to prepare the outbound exchange product shipment.

At operation 410, an apparatus (e.g., network device 150) may receive an indication that the retrieved package(s) is delivered to the distribution center 5 and the apparatus (e.g., network device 150) may trigger generation of a notification(s). The notification(s) (e.g., a SMS message(s), email message(s), voice message(s), etc.) may be sent by the apparatus (e.g., network device 150), to a device (e.g., electronic device 115) of the receiver indicating that the package with the replacement item(s)/product(s) and a return shipment label for an item(s)/product(s) to be returned is being delivered to the receiver at a predetermined time. The apparatus (e.g., network device 150) may trigger the generation of the notification(s) upon expiration of a predetermined time period prior to the scheduled time for delivery of the replacement item(s)/product(s) to the receiver. For purposes of illustration and not of limitation, the scheduled time for delivery of the replacement item(s)/product(s) to the receiver may be 12:00 PM. In this example, the apparatus (e.g., network device 150) may generate the notification upon the expiration of a time period such as for example 4 hours (e.g., 8:00 AM) prior to the scheduled time period.

At operation 415, an apparatus (e.g., network device 150) may assign a destination driver for dispatch of the replacement item(s)/product(s) to the receiver for delivery at the scheduled time. At operation 420, the destination driver may deliver the replacement item(s)/product(s) to the receiver and may, but need not, unpack the replacement item(s)/product(s) of the package(s) on behalf of the receiver and may repack an item(s)/product(s) of the same or similar type (e.g., a defective product) to be returned to the entity. In one example embodiment, instead of the driver unpacking the replacement item(s)/product(s), the receiver (e.g., a customer) may unpack the replacement item(s)/product(s) and repack the item(s)/product(s) of the same type in the package that the replacement item(s)/product(s) was included within. In this regard, it should be pointed out that the item(s)/product(s) to be returned to the entity may need to be similar to the delivered replacement item(s)/package(s) to ensure that the package is sufficient to avoid damages during the return of item(s)/product(s) to the entity.

For purposes of illustration and not of limitation the destination driver may deliver a replacement item(s)/product(s) such as, for example, medical equipment (e.g., a Magnetic Resonance Imaging (MRI) device) to the receiver and may unpack the replacement item(s)/product(s) from a package(s) for the receiver and the driver may repack an item(s)/product(s) of the same type such as, for example, defective medical equipment (e.g., a MRI device) to be returned to the entity. Optionally, in one example embodiment, in an instance in which the receiver does not provide the driver with the item(s)/product(s) of the same type for return to the entity, the driver may not provide the receiver with the replacement item(s)/product(s) and may instead depart from the location of the receiver and deliver the replacement item(s)/product(s) back to the entity.

At operation 425, an apparatus (e.g., network device 150 of the distribution center 5) may receive an indication from a DIAD (e.g., DIAD 105) of a driver that the item(s)/product(s) to be returned to the entity was collected and scanned to enable tracking and visibility regarding the status of the returned item(s)/product(s). In this regard, the DIAD 105 may scan information (e.g., a bar code of a label (e.g., a shipping label), a tracking label) of the returned item(s)/product(s). Additionally, upon scanning the returned item(s)/product(s), a processor of the DIAD (e.g., DIAD 105) may identify a current location of the item(s)/product(s) being scanned by generating a global positioning system (GPS) determination of the location. In this regard, the DIAD may provide the scan information and the location information to the network device 150. As such, the network device 150 may provide this information to a web site so that it may be accessible to track the visibility of the returned item(s)/product(s) in transit to the entity (e.g., return center 2) and may provide the details of the location in which the items was retrieved.

In an example embodiment, a DIAD may designate information being scanned as a product exchange services (also referred to herein as Exchange) shipment which may be utilized for visibility and tracking information. The network device 150 may designate the information as a product exchange services shipment based in part on detection of information (e.g., indicators in the package-level detail) on a package of the item(s)/product(s) to be returned to the entity. In an alternative example embodiment, the driver may utilize the DIAD to specify that the item(s)/product(s) being returned relates to a product exchange services shipment (e.g., an Exchange outbound shipment, an Exchange return shipment) and this information may be provided to the network device 150 which may upload this information to the web site. In this regard, in an instance in which the web site is accessed, a device may determine that tracking and visibility information is associated with a product exchange services shipment (e.g., an Exchange shipment).

In one example embodiment, a processor (e.g., processor 70, product exchange module 78) of an apparatus (e.g., network device 150) may assign a tracking number (e.g., 1 ZABC) for the replacement item(s)/product(s) being sent to the receiver and another tracking number (e.g., 1 ZDEF) for an item(s)/product(s) to be returned to the entity from the receiver by the distribution center 5. However, in one example embodiment, both an outbound leg (e.g., delivery of the replacement item(s)/package(s) to the receiver) and an inbound leg (e.g., delivery of an item(s)/product(s) of a receiver to be returned to the entity) of a product exchange services delivery (e.g., Exchange shipment) may be linked to an identical reference number (e.g., a tracking number, an identical shipping account number). As such, information regarding both the outbound and inbound legs may be linked, identified and accessible via the web site, for example, by utilizing the same reference number.

Optionally, at operation 430, an apparatus (e.g., network device 150) may receive a generated message from a device (e.g., DIAD 105) of a driver indicating completion of collection of the item(s)/product(s) to be returned and delivery of the replacement item(s)/product(s) to the receiver and provide the item(s)/product(s) to be returned to the entity.

In one example embodiment, upon completion of the delivery of the replacement item(s)/product(s) to the receiver (e.g., a customer (e.g., customer 4)) and delivery of the item(s)/product(s) to be returned to the entity, the network device 150 may determine a cost for both deliveries and may send the cost to a device (e.g., electronic device 110) of the entity (e.g., return center 2) for payment. The device of the entity may display the cost via a display (e.g., display 30) of the device.

In an alternative example embodiment, the network device 150 may determine the cost for delivery of the replacement item(s)/product(s) to the receiver for the outbound leg upon delivery of the replacement item(s)/product(s) to the receiver and may send the cost (e.g. visible indicia indicating the cost) to a device (e.g., electronic device 110) of the entity for payment. Additionally, upon completion of the delivery of the item(s)/product(s) to be returned to the entity by the receiver, the network device 150 may determine the cost for the inbound leg and may send the cost (e.g., visible indicia for the cost) for the inbound leg to the device of the entity for payment.

Referring now to FIG. 5, a flowchart of an example method of facilitating an exchange of one or more products according to another example embodiment is provided. At operation 500, an apparatus (e.g., network device 150) may receive an indication of a selection from an entity to pack and collect an item(s)/product(s) of a receiver for return to the entity. The selection may be made by a device (e.g., electronic device 110) of the entity (e.g., return center 2) in response to receipt of a request from a device of a receiver to return an item(s)/product(s) to the entity. At operation 505, an apparatus (e.g., network device 150) may generate a return label(s) and may determine an appropriate pack and collect box(es) for packaging the item(s)/product(s) of the receiver in response to receipt of the indication of the selection to pack and collect the item(s)/product(s).

At operation 510, an apparatus (e.g., network device 150) may trigger generation of one or more notifications (e.g., SMS messages, email messages, voice messages, etc.) that may be sent to a device (e.g., phone 100, one of electronic devices 115, 120, 125) of a receiver (e.g., customer (e.g., customer 4)) indicating that the return label(s) and the pack and collect box(es) is being delivered to the receiver at a predetermined time. At operation 515, an apparatus (e.g., network device 150) may assign a destination driver for dispatch of the return label(s) and the pack and collect box to the receiver. At operation 520, the destination driver may deliver the return label(s) and the pack and collect box(es) to the receiver. Additionally, the driver may, but need not, pack the item(s)/product(s) to be returned to the entity (e.g., a company, a manufacturer of the item(s)/product(s)) in a pack and collect box. The delivery of the box(es) and return label(s) and the collection of the return item(s)/product(s) may happen at the same location/time (e.g., at the delivery destination). At operation 525, an apparatus (e.g., network device 150) may receive an indication that the item(s)/product(s) packed in the collect box(es) was collected and scanned to enable tracking and visibility relating to the status of the item(s)/product(s) being returned to the entity. In an example embodiment, a DIAD (e.g., DIAD 105) may generate the indication that the item(s)/product(s) packed in the collect box(es) were collected and scanned.

In an example embodiment, a DIAD (e.g., DIAD 105) may scan information (e.g., a bar code of a label(s) (e.g., return label(s)), a tracking code(s), etc.) of the returned item(s)/product(s). The scanned information may identify the returned item(s)/product(s) and may provide additional detailed information. In response to scanning the returned item(s)/product(s), a processor of the DIAD (e.g., DIAD 105) may identify a current location of the returned item(s)/product(s) being scanned by generating a global positioning system (GPS) determination of the location. In this regard, the DIAD may provide the scan information and the location information to the network device 150. As such, the network device 150 may provide this information to a web site so that information may be accessible to track the visibility and status of the returned item(s)/package(s) being delivered in transit to the entity (e.g., return center 2 (e.g., a company, a manufacturer of the returned item(s)/product(s)). In this example embodiment, the tracking and visibility information may indicate that item(s)/product(s) being returned to the entity are part of a pack and collect shipment. In one example embodiment, the DIAD may automatically designate scanned information utilized for tracking and visibility information as a pack and collect shipment based on detection of pack and collect information of a label, for example. In an alternative example embodiment, the driver may utilize the DIAD to designate information being scanned for utilization of tracking and visibility information as a pack and collect shipment.

The processor (e.g., processor 70) and/or the product exchange module (e.g., product exchange module 78) of the network device 150 may provide the details (for example, via the web site) of the locations of the returned items(s)/product(s) while in transit to the entity. In one example embodiment, by analyzing the visibility of the status information, the entity may obtain full visibility of its defective stock of products and may utilize this information to improve warehouse productivity. For example, by linking outbound tracking information (e.g., tracking numbers) and return tracking information, via the processor and/or product exchange module of the network device 150, the network device 150 may improve visibility and enable better planning for returns process staffing, warehouse space utilization, transportation planning, etc.

Optionally, at operation 530, an apparatus (e.g., network device 150) may receive a message from a device (e.g., DIAD 105) indicating completion of the collection of the packed item(s)/product(s) from the receiver and delivery of the item(s)/product(s) to the entity.

The device (e.g., DIAD) may send the message to the apparatus in response to a driver utilizing the device (e.g., DIAD) to indicate that the collection and delivery is complete. In this regard, the example embodiments may increase a rate of return of products to the entity. In one example embodiment, in an instance in which the returned item(s)/product(s) is repaired by the entity, or a determination is made by the entity that the item(s)/product(s) cannot be repaired, the entity may send a request to the network device 150 of the distribution center 2 to deliver the repaired product(s)/item(s) or another new or refurbished item(s)/product(s) of the same type to the receiver.

Referring now to FIG. 6, a diagram of a product exchange service label is illustrated according to an example embodiment. The product exchange service label 3 of FIG. 6 may be generated by a processor (e.g., processor 70, product exchange module 78) of the network device 150 in response to receipt of an indication of a selection to by a device (e.g., electronic device 110). The selection of the device of the entity may be a request for an exchange service shipment of a replacement item(s)/product(s) to a receiver (e.g., customer). The product exchange service label 3 in the example embodiment of FIG. 6 may denote that upon delivery of a replacement item(s)/product(s) to a receiver, another item(s)/product(s) of the same type is to be picked up from the receiver and packed for delivery to the entity.

Referring now to FIG. 7, a diagram of a pack and collect service label is illustrated according to an example embodiment of the invention. The pack and collect service label 5 may be generated by the processor (e.g., processor 70) and/or the product exchange module (e.g., product exchange module 78) of the network device 150 in response to receipt of an indication of a selection by a device (e.g., electronic device 110) of the entity (e.g., return center 2) of a pack and collect service request. The pack and collect service request may be an option among various provided product returns/shipping options (e.g., a product exchange service option) for selection. The pack and collect label 5 generated by the network device 150 may be provided to a collect box designated and selected for return of an item(s)/product(s) of a receiver to the entity.

Referring now to FIGS. 8A, 8B and 8C, diagrams illustrating pack and collect boxes according to an example embodiment are provided. The pack and collect boxes of some example embodiments may have various sizes to accommodate a variety of parts and item(s)/product(s) for return to an entity. The pack and collect box 11 of FIG. 8A may have a large size to accommodate multiple product shapes including but not limited to laptops, game consoles, receivers, flat panel monitors (e.g., with similar product dimensions, weight and transportability). The pack and collect box 12 of FIG. 8B may have a small size and may be configured to accommodate an item(s)/product(s) with small shapes having similar product dimensions such as, for example, mobile phones, PDAs, small digital cameras, navigation systems, electronic parts or any other suitable items/products. The pack and collect box 14 of FIG. 8C may have a medium size to accommodate an item(s)/product(s) such as, for example, small notebook computers, tablet PCs and any other suitable items/products with similar product dimensions, weight and transportability. It should be pointed out that the pack and collect boxes of FIGS. 8A-8C are for purposes of illustration and not of limitation. In this regard, some exemplary embodiments may utilize other pack and collect boxes having different sizes to accommodate other items/products without departing from the spirit and scope of the invention.

Referring now to FIG. 9, a flowchart of a mechanism of facilitating product exchanges according to an example embodiment is provided. At operation 900, an apparatus (e.g., network device 150) may trigger an exchange procedure to facilitate return of a product(s) of a user to an entity (e.g., return center 2 (e.g., a return center of a company, a manufacturer/provider of products, etc.) in response to receipt of an indication of a selection of a return service option of a plurality of product return options (e.g., a pack and collect service option, a product exchange service option for a shipment of a replacement item(s)/product(s)).

At operation 905, an apparatus (e.g., network device 150) may generate at least one shipping return label(s) and may identify a collection box(es) (e.g., boxes 11, 12, 14) for inclusion of the product in response to the receipt of the indication of the selection. At operation 910, an apparatus (e.g., network device 150) may generate one or more notifications (e.g., SMS messages, email messages, voice messages, etc.) sent to a device(s) (e.g., phone 100, any of electronic devices 115, 120, 125) notifying the user of a scheduled time or time period for pickup of the product.

At operation 915, an apparatus (e.g., network device 150) may receive a first indication that the product for return to the entity (e.g., return center 2) is packaged in an collection box, that scanned information of the return label is captured (e.g., via a DIAD (e.g., DIAD 105)) and that the product is collected (e.g., by a driver) from the user for delivery to the entity. The product is packaged in the collection box, the information of the return label is captured and the product is collected from the user during the pickup in a single transaction. At apparatus 920, an apparatus (e.g., network device 150) may receive a second indication that the product is successfully delivered to the entity. In an example embodiment, a DIAD (e.g., DIAD 105) may provide the indication to the apparatus (e.g., network device 150) that the product is delivered to the entity.

Optionally, at operation 925, an apparatus (e.g., network device 150) may schedule a delivery of a replacement unit to the user in response to receipt of a request from the entity confirming receipt (e.g., delivery) of the product. Optionally, at operation 930, prior to generating the shipping label, an apparatus (e.g., network device 150) may schedule retrieval of a replacement product from the entity at a specified time or specified time period to replace the product in response to receipt of the indication of the selection. The replacement product may be provided to the user during the pickup of the product and an indication may be sent to the network device 150 by the DIAD (e.g., DIAD 105) indicating that the replacement product is delivered to the user.

It should be pointed out that FIGS. 4, 5 and 9 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86, memory 36) and executed by a processor (e.g., processor 70, processor 34, product exchange module 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 4, 5 and 9 above may comprise a processor (e.g., the processor 70, the processor 34, the product exchange module 78) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 70, the processor 34 (e.g., as means for performing any of the operations described above), the product exchange module 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   triggering, via a processor of a network device, an exchange procedure to facilitate return of at least one product of a user to an entity in response to receipt of an indication of a selection of a return service option among a plurality of product return options;
   scheduling, via the processor, retrieval of a replacement product from the entity, at a designated time or designated time period, to replace the product to be returned in response to receipt of the indication of the selection;
   designating, via the processor, the replacement product for delivery to the user during pickup of the product to be returned from the user;
   electronically generating, via the processor, at least one shipping return label and identifying at least one collection box for inclusion of the product in response to the receipt of the indication of the selection, the shipping return label affixed to an exterior of the collection box and comprises readable indicia of a tracking number and one or more bar codes, the tracking number scanned by a mobile acquisition device to obtain tracking information, and the bar codes scanned by the mobile acquisition device to identify the replacement product;
   generating, via the processor, one or more notifications sent to at least one device notifying the user of a scheduled time or time period for pickup of the product;
   receiving, via the processor, a first indication that the product for return to the entity is packaged in the collection box, that scanned information of the return label is captured and that the product is collected from the user for delivery to the entity,
   wherein the product is packaged in the collection box, the information of the return label is captured and the product is collected from the user during the pickup of the product in a single transaction, and wherein capturing the scanned information verifies that the product for return is collected from the user and packaged in the collection box;
   detecting (i) a current location, via a global positioning system, of the replacement product while the replacement product is being transported from the entity to the user and (ii) a status of the replacement product being transported, in part, in response to the mobile acquisition device scanning the readable indicia of the tracking number;
   providing visibility indicia of the detected current location and the status of the replacement product to an interface to enable user interaction, via the interface, with the visibility indicia while the replacement product is in transit from the entity to the user and
   analyzing the visibility indicia, in part, to determine visibility of defective stock of products of the entity.

2. The method of claim 1, further comprising:
   scheduling a delivery of a replacement unit to the user in response to receipt of a request from the entity confirming receipt of the product, wherein the entity is a provider of products of a same or similar type as the product.

3. The method of claim 2, wherein the request comprises information specifying that the product was repaired or that the replacement unit corresponds to a refurbished or new product in an instance in which the entity determined that the product is incapable of being repaired.

4. The method of claim 1, further comprising:
receiving a second indication that the product is delivered to the entity, wherein the entity is a provider of products of a same or similar type as the product.

5. The method of claim 4, wherein prior to receiving the indication that the product is packaged, the method further comprises:
including the replacement product in the collection box; and
unpacking the replacement product from the collection box upon pickup of the product to enable packaging of the product for return to the entity in the collection box.

6. The method of claim 4, wherein prior to receiving the second indication, the method further comprising:
receiving another indication that the replacement product is delivered to the user during the time period for pickup of the product.

7. The method of claim 6, further comprising:
providing visible indicia identifying a determined cost, to a device of the entity, for the delivery of the replacement product from the entity to the user in response to receipt of the another indication; and
providing visible indicia identifying another determined cost, to the device of the entity, for the delivery of the product from the user to the entity in response to receipt of the second indication.

8. The method of claim 1, wherein generating the notifications comprises generating the notifications in response to expiration of a predetermined time period prior to the scheduled time or time period.

9. The method of claim 1, further comprising:
evaluating the scanned information in part to access status information relating to data indicating a plurality of defective products of the entity; and
utilizing the data indicating the plurality of defective products in part to improve productivity of a warehouse.

10. An apparatus comprising at least one memory including computer program code, the at least one memory and the computer program code configured to, with at least one processor, cause the apparatus to at least:
trigger an exchange procedure to facilitate return of at least one product of a user to an entity in response to receipt of an indication of a selection of a return service option among a plurality of product return options;
schedule retrieval of a replacement product from the entity, at a designated time or designated time period, to replace the product to be returned in response to receipt of the indication of the selection;
designate the replacement product for delivery to the user during pickup of the product to be returned from the user;
electronically generate at least one shipping return label and identifying at least one collection box for inclusion of the product in response to the receipt of the indication of the selection, the shipping return label affixed to an exterior of the collection box and comprises readable indicia of a tracking number and one or more bar codes, the tracking number scanned by a mobile acquisition device to obtain tracking information, and the bar codes scanned by the mobile acquisition device to identify the replacement product;
generate one or more notifications sent to at least one device notifying the user of a scheduled time or time period for pickup of the product;

receive a first indication that the product for return to the entity is packaged in the collection box, that scanned information of the return label is captured and that the product is collected from the user for delivery to the entity,
wherein the product is packaged in the collection box, the information of the return label is captured and the product is collected from the user during the pickup of the product in a single transaction, and wherein capturing the scanned information verifies that the product for return is collected from the user and packaged in the collection box;
detect (i) a current location, via a global positioning system, of the replacement product while the replacement product is being transported from the entity to the user and (ii) a status of the replacement product being transported, in part, in response to the mobile acquisition device scanning the readable indicia of the tracking number;
provide visibility indicia of the detected current location and the status of the replacement product to an interface to enable user interaction, via the interface, with the visibility indicia while the replacement product is in transit from the entity to the user and
analyze the visibility indicia, in part, to determine visibility of defective stock of products of the entity.

11. The apparatus of claim 10, wherein the memory and computer program code are further configured to, with the processor, cause the apparatus to:
schedule a delivery of a replacement unit to the user in response to receipt of a request from the entity confirming receipt of the product, wherein the entity is a provider of products of a same or similar type as the product.

12. The apparatus of claim 11, wherein the request comprises information specifying that the product was repaired or that the replacement unit corresponds to a refurbished or new product in an instance in which the entity determined that the product is incapable of being repaired.

13. The apparatus of claim 10, wherein the memory and computer program code are further configured to, with the processor, cause the apparatus to:
receive a second indication that the product is delivered to the entity,
wherein the entity is a provider of products of a same or similar type as the product.

14. The apparatus of claim 13, wherein prior to receive the second indication, the memory and computer program code are further configured to, with the processor, cause the apparatus to:
receive another indication that the replacement product is delivered to the user during the time period for pickup of the product.

15. The apparatus of claim 14, wherein the memory and computer program code are further configured to, with the processor, cause the apparatus to:
provide visible indicia identifying a determined cost, to a device of the entity, for the delivery of the replacement product from the entity to the user in response to receipt of the another indication; and
provide visible indicia identifying another determined cost, to the device of the entity, for the delivery of the product from the user to the entity in response to receipt of the second indication.

16. The apparatus of claim 10, wherein the memory and computer program code are further configured to, with the processor, cause the apparatus to:

generate the notifications by generating the notifications in response to expiration of a predetermined time period prior to the scheduled time or time period.

17. The apparatus of claim 10, wherein the memory and computer program code are further configured to, with the processor, cause the apparatus to:
evaluate the scanned information in part to access status information relating to data indicating a plurality of defective products of the entity; and
utilize the data indicating the plurality of defective products in part to improve productivity of a warehouse.

18. A computer program product comprising at least one non-transitory computer-readable storage medium having computer-readable program code portions stored therein, the computer-readable program code portions comprising:
program code instructions configured to trigger an exchange procedure to facilitate return of at least one product of a user to an entity in response to receipt of an indication of a selection of a return service option among a plurality of product return options;
program code instructions configured to schedule retrieval of a replacement product from the entity, at a designated time or designated time period, to replace the product to be returned in response to receipt of the indication of the selection;
program code instructions configured to designate the replacement product for delivery to the user during pickup of the product to be returned from the user;
program code instructions configured to electronically generate at least one shipping return label and identifying at least one collection box for inclusion of the product in response to the receipt of the indication of the selection, the shipping return label affixed to an exterior of the collection box and comprises readable indicia of a tracking number and one or more bar codes, the tracking number scanned by a mobile acquisition device to obtain tracking information, and the bar codes scanned by the mobile acquisition device to identify the replacement product;
program code instructions configured to generate one or more notifications sent to at least one device notifying the user of a scheduled time or time period for pickup of the product;
program code instructions configured to cause receipt of a first indication that the product for return to the entity is packaged in the collection box, that scanned information of the return label is captured and that the product is collected from the user for delivery to the entity,
wherein the product is packaged in the collection box, the information of the return label is captured and the product is collected from the user during the pickup of the product in a single transaction, and wherein capturing the scanned information verifies that the product for return is collected from the user and packaged in the collection box;
program code instructions configured to detect (i) a current location, via a global positioning system, of the replacement product while the replacement product is being transported from the entity to the user and (ii) a status of the replacement product being transported, in part, in response to the mobile acquisition device scanning the readable indicia of the tracking number; and
program code instructions configured to provide visibility indicia of the detected current location and the status of the replacement product to an interface to enable user interaction, via the interface, with the visibility indicia while the replacement product is in transit from the entity to the user and
program code instructions configured to analyze the visibility indicia, in part, to determine visibility of defective stock of products of the entity.

19. The computer program product of claim 18, further comprising:
program code instructions configured to schedule a delivery of a replacement unit to the user in response to receipt of a request from the entity confirming receipt of the product, wherein the entity is a provider of products of a same or similar type as the product.

20. The computer program product of claim 19, wherein the request comprises information specifying that the product was repaired or that the replacement unit corresponds to a refurbished or new product in an instance in which the entity determined that the product is incapable of being repaired.

21. The computer program product of claim 18, further comprising:
program code instructions configured to cause receipt of a second indication that the product is delivered to the entity,
wherein the entity is a provider of products of a same or similar type as the product.

22. The computer program product of claim 21, wherein prior to cause receipt of the second indication, the computer program product further comprises: program code instructions configured to cause receipt of another indication that the replacement product is delivered to the user during the time period for pickup of the product.

23. The computer program product of claim 18, wherein generate the notifications comprises generating the notifications in response to expiration of a predetermined time period prior to the scheduled time or time period.

* * * * *

UNITED STATES PATENT AND TRADEMARK OFFICE
CERTIFICATE OF CORRECTION

PATENT NO. : 10,558,939 B2  
APPLICATION NO. : 13/338858  
DATED : February 11, 2020  
INVENTOR(S) : Sumeet Pradeep Shroff et al.

Page 1 of 1

It is certified that error appears in the above-identified patent and that said Letters Patent is hereby corrected as shown below:

In the Claims

Column 16, Line 56: In Claim 1, after "user" insert -- ; --.
Column 18, Line 24: In Claim 10, after "user" insert -- ; --.
Column 20, Line 18: In Claim 18, after "user" insert -- ; --.

Signed and Sealed this
Seventh Day of April, 2020

Andrei Iancu
*Director of the United States Patent and Trademark Office*